(12) United States Patent
Maguire et al.

(10) Patent No.: US 10,968,835 B2
(45) Date of Patent: Apr. 6, 2021

(54) APPARATUS FOR GAS TURBINE ENGINES

(71) Applicant: ROLLS-ROYCE plc, London (GB)

(72) Inventors: Alan R. Maguire, Derby (GB);
Richard G. Stretton,
Ashby-de-la-Zouch (GB)

(73) Assignee: ROLLS-ROYCE plc, London (GB)

( * ) Notice: Subject to any disclaimer, the term of this patent is extended or adjusted under 35 U.S.C. 154(b) by 98 days.

(21) Appl. No.: 16/437,907

(22) Filed: Jun. 11, 2019

(65) Prior Publication Data

US 2020/0011250 A1 Jan. 9, 2020

(30) Foreign Application Priority Data

Jul. 9, 2018 (GB) .................................... 1811219

(51) Int. Cl.
*F02C 7/00* (2006.01)
*F02C 9/22* (2006.01)
*F02C 7/36* (2006.01)

(52) U.S. Cl.
CPC . *F02C 9/22* (2013.01); *F02C 7/36* (2013.01)

(58) Field of Classification Search
CPC .... F02C 7/00; F02C 7/32; F02C 7/275; F02C 7/36
See application file for complete search history.

(56) References Cited

U.S. PATENT DOCUMENTS

| 2002/0189231 A1 | 12/2002 | Franchet et al. |
| 2006/0248900 A1 | 11/2006 | Suciu et al. |
| 2011/0284328 A1* | 11/2011 | Brandt ............... F02C 7/36 184/6.11 |
| 2016/0138476 A1 | 5/2016 | Lemarchand et al. |
| 2017/0044988 A1* | 2/2017 | Lemarchand ........... F02C 7/32 |

FOREIGN PATENT DOCUMENTS

| EP | 1916390 A2 | 4/2008 |
| EP | 2123883 A2 | 11/2009 |
| EP | 2584173 A1 | 4/2013 |
| GB | 2187796 A | 9/1987 |
| WO | 2005/005810 A1 | 1/2005 |

OTHER PUBLICATIONS

Jan. 7, 2019 Search Report issued in Great Britain Application No. 1811219.3.
Dec. 9, 2019 Search Report issued in European Patent Application No. 19179242.

* cited by examiner

*Primary Examiner* — Steven M Sutherland
(74) *Attorney, Agent, or Firm* — Oliff PLC

(57) ABSTRACT

Apparatus for a gas turbine engine, the apparatus comprising: a core engine casing having a longitudinal axis and including: an inner wall defining at least part of a core airflow path through the gas turbine engine; an outer wall defining an external surface of the core engine casing, a first cavity being defined between the inner wall and the outer wall of the core engine casing; a plurality of guide vanes extending radially from the outer wall of the core engine casing; a torque box defined within the first cavity of the core engine casing and at least partially overlapping axially with the plurality of guide vanes, the torque box defining a second cavity; and an accessory gear box positioned within the second cavity of the torque box.

9 Claims, 6 Drawing Sheets

APPARATUS FOR GAS TURBINE ENGINES

CROSS-REFERENCE TO RELATED APPLICATIONS

This specification is based, upon and claims the benefit of priority from UK Patent Application Number 1811219.3 filed on 9 Jul. 2018, the entire contents of which are incorporated herein by reference.

TECHNOLOGICAL FIELD

The present disclosure relates to apparatus for gas turbine engines.

BACKGROUND

A gas turbine engine may comprise an accessory gearbox that is wrapped, around and mounted on a core engine casing of the gas turbine engine. The accessory gearbox attachment features may introduce point loads into the core engine casing which may cause distortion and poor performance of the gas turbine engine from poor control of turbomachinery tip clearance.

SUMMARY

According to a first aspect there is provided apparatus for a gas turbine engine, the apparatus comprising: a core engine casing having a longitudinal axis and including: an inner wall defining at least part of a core airflow path through the gas turbine engine; an outer wall defining an external surface of the core engine casing, a first cavity being defined between the inner wall and the outer wall of the core engine casing; a plurality of guide vanes extending radially from the outer wall of the core engine casing; a torque box defined within the first cavity of the core engine casing and at least partially overlapping axially with the plurality of guide vanes, the torque box defining a second cavity; and an accessory gear box positioned within the second cavity of the torque box.

The torque box may wholly overlap axially with the plurality of guide vanes.

Each of the plurality of guide vanes may include a root portion having a leading edge at a first axial position and a trailing edge at a second axial position. The torque box may comprise a first wall located at the first axial position and a second wall located at the second axial position.

The inner wall of the core engine casing may include a bleed air valve and a conduit extending from the bleed air valve and through the second cavity of the torque box.

The apparatus may further comprise a fuel pump coupled to the accessory gearbox and positioned within the second cavity of the torque box.

The apparatus may further comprise an electrical machine coupled to the accessory gearbox and positioned within the second cavity of the torque box.

The apparatus may further comprise an oil pump coupled to the accessory gearbox and positioned within the second cavity of the torque box.

The apparatus may further comprise an oil tank positioned within the second cavity of the torque box.

According to a second aspect there is provided a gas turbine engine for an aircraft comprising: an apparatus as described in any of the preceding paragraphs of the summary; an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft.

The turbine may be a first turbine, the compressor may be a first compressor, and the core shaft may be a first core shaft; the engine core may further comprise a second turbine, a second compressor, and a second core shaft connecting the second turbine to the second compressor; and the second turbine, second compressor, and second core shaft may be arranged to rotate at a higher rotational speed than the first core shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein ray have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The, or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The, or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other, Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 025. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches). 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^-s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 degree C. (ambient pressure 101.3 kPa, temperature 30 degree C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at feast in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of descent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degree C.

As used anywhere herein, "cruise" or "cruise conditions" may mean the aerodynamic design point Such an aerodynamic design point (or ADP) may correspond to the conditions (comprising, for example, one or more of the Mach Number, environmental conditions and, thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION

Embodiments will now be described by way of example only, h reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
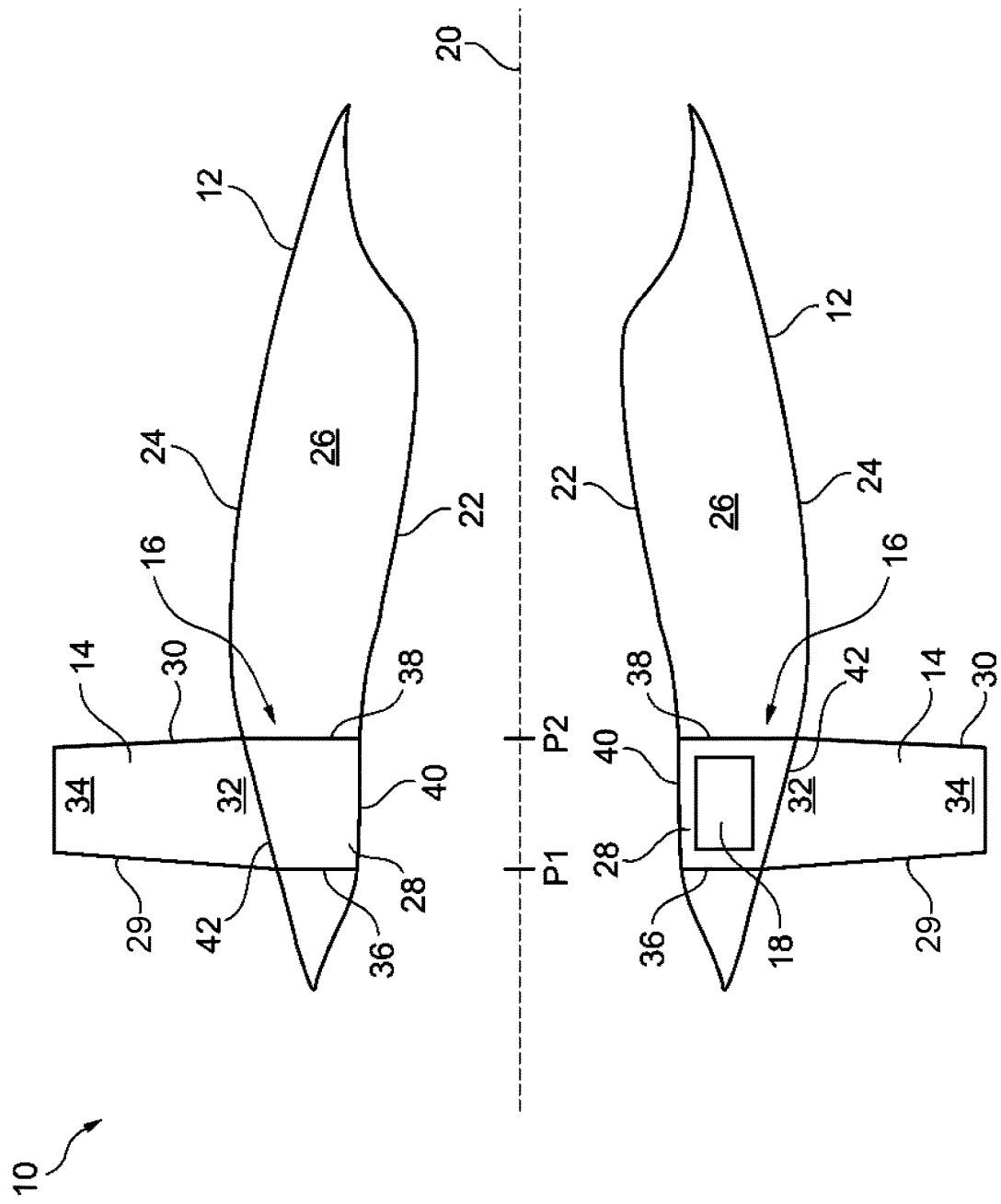
FIG. 1 illustrates a cross sectional side view of apparatus for a gas turbine engine according to a first aspect.

FIG. 1 illustrates a cross sectional side view of apparatus 10 for a gas turbine engine. The apparatus 10 includes a core engine casing 12, a plurality of guide vanes 14, a torque box 16, and an accessory gearbox 18. In some examples, the apparatus 10 may be a module. As used herein, the wording 'module' refers to an assembly where one or more features are included at a later time and, possibly, by another manufacturer or by an end user.

The core engine casing 12 defines a cylindrical shape and has a longitudinal axis 20 and includes an inner wall 22 and an outer wall 24. The inner wall 22 defines an internal surface of the core engine casing 12 and at least part of a core airflow path through the gas turbine engine. The outer wall 24 defines an external surface of the core engine casing 12 and at least part of a bypass duct of the gas turbine engine. The outer wall 24 may be a core engine fairing or a nacelle fairing in some examples. The inner wall 22 and the outer wall 24 define a first cavity 26 there between.

The geometry of the apparatus 10 may be defined by a conventional axis system, comprising an axial direction (which is parallel to the longitudinal axis 20), a radial direction (which is perpendicular to the longitudinal axis 20), and a circumferential direction (perpendicular to the page in the FIG. 1 view). The axial, radial and circumferential directions are mutually perpendicular.

The plurality of guide vanes 14 extend radially from the outer wall 24 of the core engine casing 12 relative to the longitudinal axis 20. Each of the plurality of guide vanes 14 comprises a leading edge 29, a trailing edge 30, a root portion 32, and a tip portion 34. The plurality of guide vanes 14 may be referred to as 'structural vanes' since they are configured to transfer loads between a core engine of the gas turbine engine and a nacelle of the gas turbine engine. In some examples, the plurality of guide vanes 14 may be referred to as outlet guide vanes (OGV's).

The torque box 16 is defined within the first cavity 26 of the core engine casing 12 and defines a second cavity 28. The torque box 16 comprises a first wall 36, a second wall 38, a third wall 40, and a fourth wall 42. The first wall 36 extends radially between the inner wall 22 and the outer wall 24 of the core engine casing 12 and has a first axial position P1. The second wall 38 extends radially between the inner wall 22 and the outer wall 24 of the core engine casing 12 and has a second axial position P2 that is different to and downstream from the first axial position P1. The third wall 40 extends axially between the first wall 36 and the second wall 38 and may be provided by the inner wall 22 (such as a reinforced part of the core engine casing 12), or by a wall that is separate from the inner wall 22. The fourth wall 42 extends axially between the first wall 36 and the second wall 38 and may be provided by the outer wall 24 (such as a reinforced part of the core engine casing 12), or by a wall that is separate from the outer wall 24.

The plurality of guide vanes 14 are connected to the torque box 16. For example, the plurality of guide vanes 14 may be connected to the torque box 16 via a plurality of fasteners (such as a plurality of rivets or bolts). In another example, the plurality of guide vanes 14 may be welded to the torque box 16.

The torque box 16 may wholly overlap axially with the plurality of guide vanes 14. For example, the leading edge 29 of the root portion 32 may overlap the first wall 36 of the torque box 16 at the first axial position P1, and the trailing edge 30 of the root portion 32 may overlap the second wall 38 of the torque box 16 at the second axial position P2. In another example, the leading edge 29 of the root portion 32 may overlap the first wall 36 of the torque box 16 at the first axial position P1, and the trailing edge 30 of the root portion 32 may have a position that is between the first axial position P1 and the second axial position P2. By way of a further example, the leading edge 29 of the root portion 32 may have a position that is between the first axial position P1 and the second axial position P2, and the trailing edge 30 of the root portion 32 may overlap the second wall 38 of the torque box 16 at the second axial position P2.

In other examples, the torque box 16 may partially overlap axially with the plurality of guide vanes 14. For example, the leading edge 29 of the root portion 32 may have a position that is at the first axial position P1 or between the first axial position P1 and the second axial position P2, and the trailing edge 30 of the root portion 32 may have a position that is downstream of the second axial position P2. In another example, the leading edge 29 of the root portion 32 may have a position that is upstream of the first axial position P1, and the trailing edge 30 of the root portion 32 may have a position that is at the second axial position P2, or between the first axial position P1 and the second axial position P2.

The accessory gearbox 18 is positioned within the second cavity 28 of the torque box 16 and may be mounted on any one or more of: the first wall 36; the second wall 38; the third wall 40 and the fourth wall 42 of the torque box 16. The accessory gearbox 18 comprises: an input gear for receiving torque from a core engine of the gas turbine engine; and a plurality of output gears for providing torque to a plurality of accessories (such as an electrical machine, an oil pump, a fuel pump, and so on).

Figure 2:
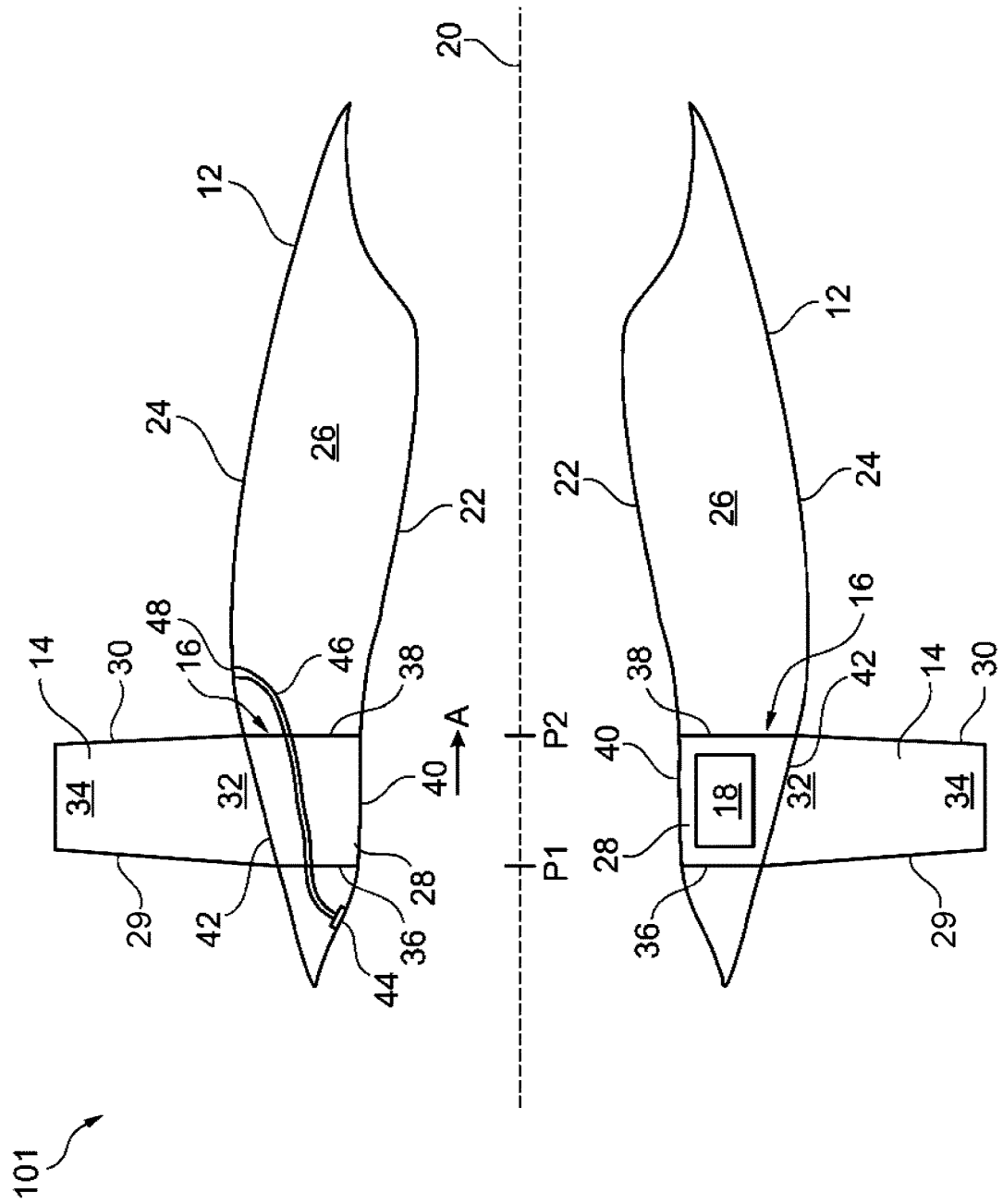
FIG. 2 illustrates a cross sectional side view of apparatus for a gas turbine engine according to a second aspect.

FIG. 2 illustrates a cross sectional side view of apparatus 101 for a gas turbine engine according to a second aspect. The apparatus 101 is similar to the apparatus 10 and where the features are similar, the same reference numerals are used.

The apparatus 101 differs from the apparatus 10 in that the inner wall 22 of the core engine casing 12 includes a bleed air valve 44 and a conduit 46 extending from the bleed air valve 44 and through the second cavity 28 of the torque box 16. In this example, the bleed air valve 44 is positioned axially upstream/forwards of the first wall 36 of the torque box 16. The conduit 46 extends from the bleed air valve 44 and through the first wall 36, traverses the second cavity 28, extends through the second wall 38, and has an outlet 48 in the outer wall 24 that is downstream from the second wall 38 of the torque box 16.

In another example, the bleed air valve 44 may be positioned axially at a location upstream from the first wall 36 and the outlet 48 may be positioned axially between the first wall 36 and the second wall 38. In a further example, the bleed air valve 44 may be positioned axially between the first wall 36 and the second wall 38, and the outlet 48 may be positioned axially downstream from the second wall 38. In another example, the bleed air valve 44 may be positioned axially between the first wall 36 and the second wall 38, and the outlet 48 may be positioned axially between the first wall 36 and the second wall 38.

Figure 3:
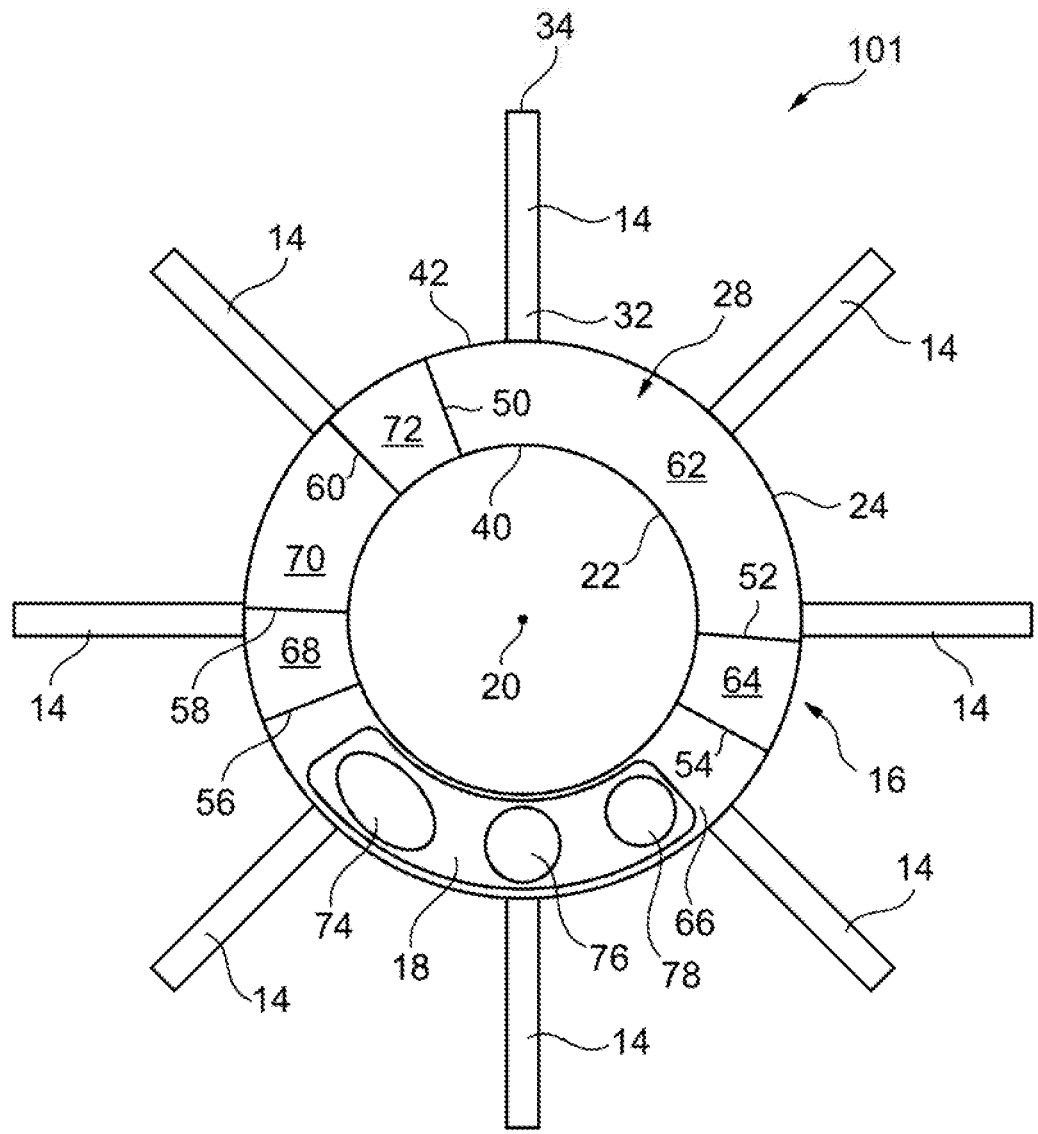
FIG. 3 illustrates a cross sectional front view of the apparatus illustrated in FIG. 2.

FIG. 3 illustrates a cross sectional front view of the apparatus 101 in the direction of arrow A at an axial location between the first wall 36 and the second wall 38. The torque box 16 further comprises a fifth wall 50, a sixth wall 52, a seventh wall 54, an eighth wall 56, a ninth wall 58, and a tenth wall 60 which extend radially between the third wall 40 and the fourth wall 42 of the torque box 16, and axially between the first wall 36 and second wall 38 of the torque box 16. The fifth wall 50 and, the sixth wall 52 define a first compartment 62 within the torque box 16. The sixth wall 52 and the seventh wall 54 define a second compartment 64 within the torque box 16. The seventh wall 54 and the eighth wall 56 define a third compartment 66 within the torque box 16. The eighth wall 56 and the ninth wall 58 define a fourth compartment 68 within the torque box 16. The ninth wall 58 and the tenth wall 60 define a fifth compartment 70 within the torque box 16. The tenth wall 60 and the fifth wall 50 define a sixth compartment 72.

The first compartment 62 houses an oil tank for a gearbox of the gas turbine engine (such as the accessory gearbox 18). The second compartment 64 houses the conduit 46 for bleed air. The third compartment 66 houses the accessory gearbox 18 and the following accessories connected to the accessory gearbox 18: an electrical machine 75; a fuel pump 76; and an oil pump 78. The fourth compartment 68 houses another conduit 46 for bleed air. The fifth compartment 70 houses electronics such as an electronic engine controller for the gas turbine engine. The sixth compartment 72 houses a further conduit 46 for bleed air.

The apparatus 10, 101 may provide several advantages. First, the apparatus 10, 101 may have a reduced part count relative to similar structures in known gas turbine engines due to the reduction in, or elimination of: gearbox mounts, accessory gearbox transfer shaft length, bleed ducts, and gearbox oil tank and mounts. Second, the apparatus 10, 101 may have a reduced manufacturing cost due to the reduced part count and build time. Third, the apparatus 10, 101 may have improved structural integrity relative to similar structures in known gas turbine engines due to improved core engine casing stiffness. Fourth, the apparatus 10, 101 may enable improved tip clearance control in a gas turbine engine due to reduced distortion of the core engine casing 12. Fifth, the apparatus 10, 101 may be lighter than similar structures in known gas turbine engines and thus a gas turbine engine incorporating is the apparatus 10, 101 may have improved specific fuel consumption and performance relative to known gas turbine engines. Sixth, the torque box 16 may provide a bulkhead that allows some accessories to be accommodated in the cooler forward part of the core engine 86. Seventh, the close proximity coupling of accessories to the core engine 86 may reduce the length of connecting pipes. For example, the close coupling of the fuel pump 76, fuel metering unit, and, variable stator vane actuator may reduce the length of the pipes connected to those components. Eighth, the apparatus 10, 101 may enable the accessory gearbox 18 and accessories to be positioned forwards/upstream of the manifold of combustion equipment of a gas turbine engine which may provide improved maintenance access.

Figure 4:
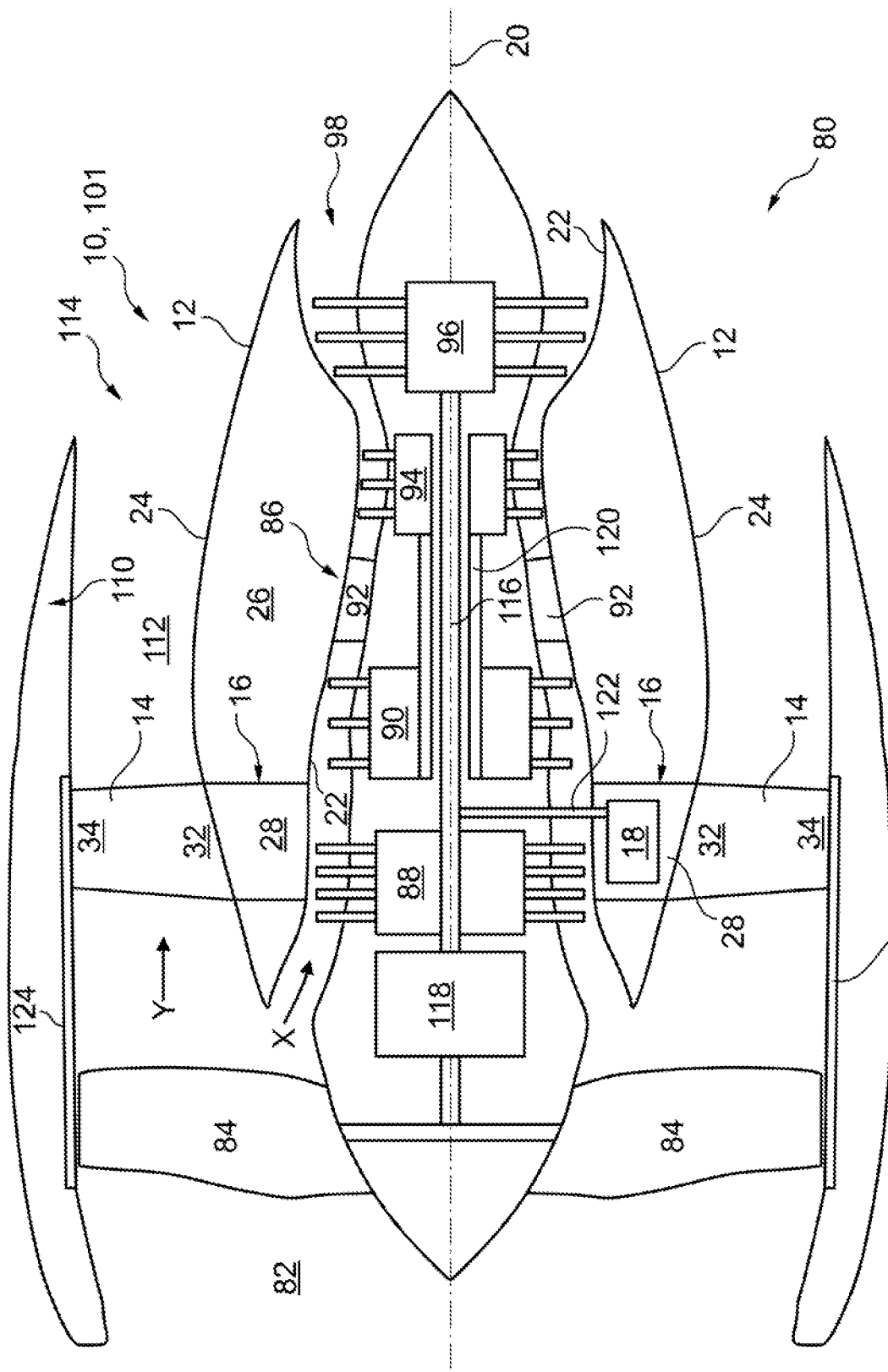
FIG. 4 illustrates a cross sectional side view of a gas turbine engine.

FIG. 4 illustrates a gas turbine engine 80 comprising the apparatus 10, 101. The gas turbine engine 80 has a rotational axis 20 (that is, the same as the longitudinal axis of the apparatus 10, 101) and comprises an air intake 82 and a propulsive fan 84 that generates two airflows: a core airflow X and a bypass airflow Y. The gas turbine engine 80 comprises an engine core 86 that receives the core airflow X. The engine core 86 comprises, in axial flow series, a low pressure compressor 88, a high-pressure compressor 90, combustion equipment 92, a high-pressure turbine 94, a low pressure turbine 96 and a core exhaust nozzle 98. A nacelle 110 surrounds the gas turbine engine 80 and defines a bypass duct 112 and a bypass exhaust nozzle 114. The bypass airflow Y flows through the bypass duct 114. The fan 84 is attached to and driven by the low pressure turbine 96 via a shaft 116 and an epicyclic gearbox 118.

In use, the core airflow X is accelerated and compressed by the low pressure compressor 88 and directed into the high pressure compressor 90 where further compression takes place. The compressed air exhausted from the high pressure compressor 90 is directed into the combustion equipment 92 where it is mixed with fuel and the mixture is combusted. The resultant hot combustion products then expand through, and thereby drive, the high pressure and low pressure turbines 94, 96 before being exhausted through the nozzle 98 to provide some propulsive thrust. The high pressure turbine 94 drives the high pressure compressor 90 by a suitable interconnecting shaft 120. The low pressure turbine 96 drives the low pressure compressor 88 and the fan 84 via the shaft 116. The fan 84 generally provides the majority of the propulsive thrust. The epicyclic gearbox 118 is a reduction gearbox.

The apparatus 10, 101 is configured such that the accessory gearbox 18 is coupled to, and arranged to receive torque from the shaft 116 or from the shaft 120 via an arrangement of gears and drive shafts 122. The tip portion 34 of each guide vane 14 is connected to a fan casing 124 within the nacelle 110.

Figure 5:
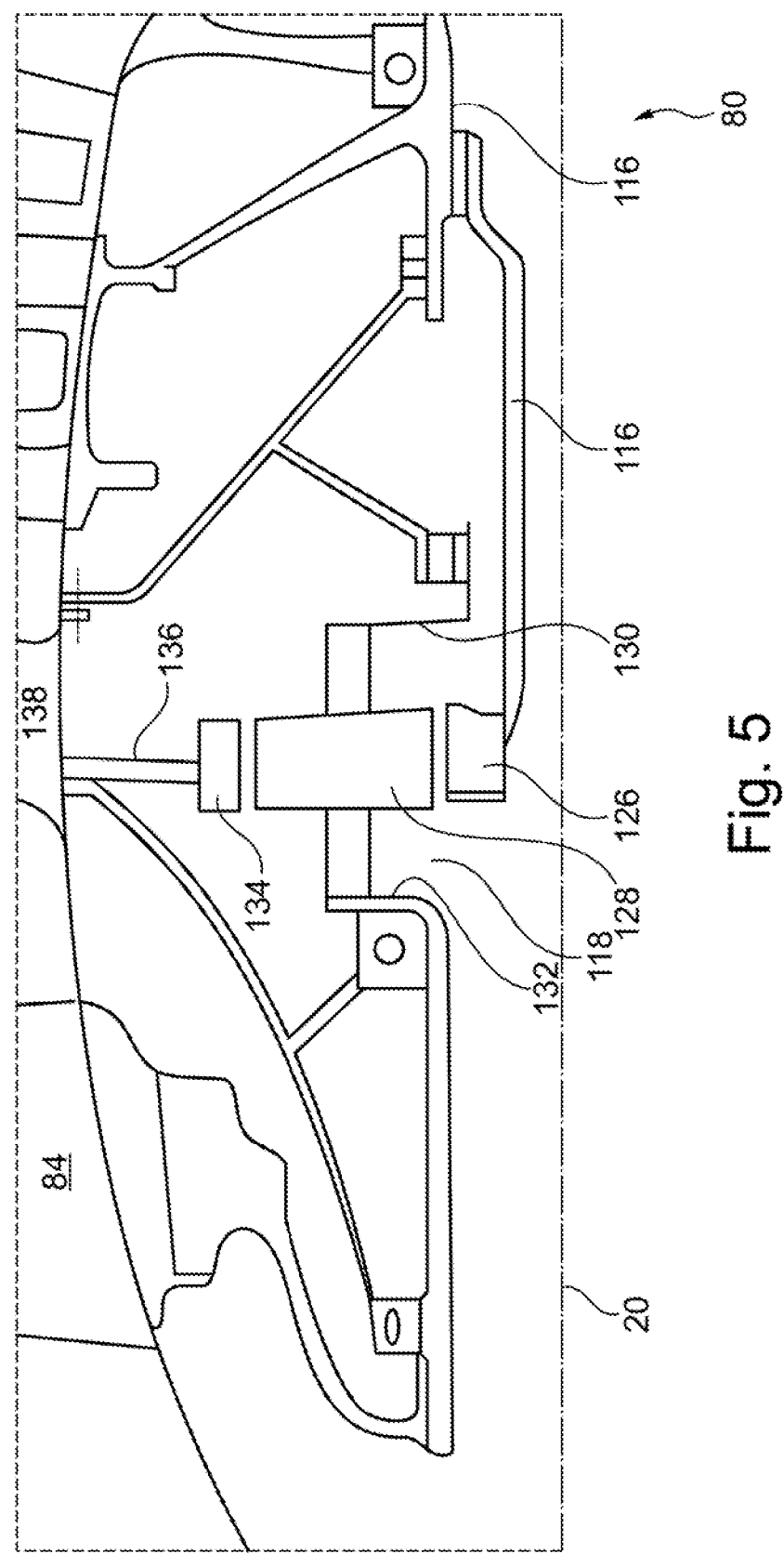
FIG. 5 illustrates close up sectional side view of an upstream portion of a gas turbine engine.

An exemplary arrangement for a geared fan gas turbine engine 80 is shown in FIG. 5. The low pressure turbine 96 (see FIG. 4) drives the shaft 116, which is coupled to a sun wheel, or sun gear 126 of the epicyclic gear arrangement 118. Radially outwardly of the sun gear 126 and intermeshing therewith is a plurality of planet gears 128 that are coupled together by a planet carrier 130. The planet carrier 130 constrains the planet gears 128 to precess around the sun gear 126 in synchronicity whilst enabling each planet gear 128 to rotate about its own axis. The planet carrier 130 is coupled via linkages 132 to the fan 84 in order to drive its rotation about the engine axis 20. Radially outwardly of the planet gears 128 and intermeshing therewith is an annulus or ring gear 134 that is coupled, via linkages 136, to a stationary supporting structure 138 (such as an engine section stator).

Note that the terms "low pressure turbine" and "low pressure compressor" as used herein may be taken to mean the lowest pressure turbine stages and lowest pressure compressor stages (i.e. not including the fan 84) respectively and/or the turbine and compressor stages that are connected together by the interconnecting shaft 116 with the lowest rotational speed in the engine (i.e. not including the gearbox output shaft that drives the fan 84). In some literature, the "low pressure turbine" and "low pressure compressor" referred to herein may alternatively be known as the "intermediate pressure turbine" and "intermediate pressure compressor". Where such alternative nomenclature is used, the fan 84 may be referred to as a first, or lowest pressure, compression stage.

Figure 6:
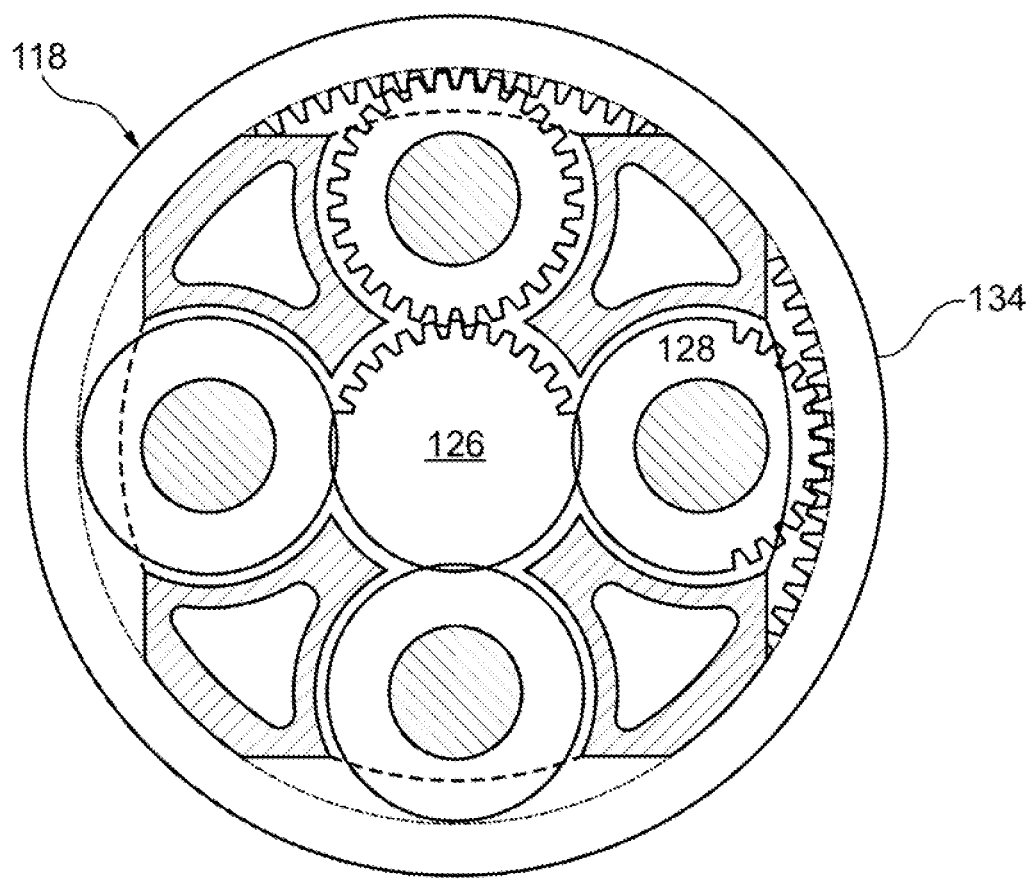
FIG. 6 illustrates a partially cut-away view of a gearbox for a gas turbine engine.

The epicyclic gearbox 118 is shown by way of example in greater detail in FIG. 6. Each of the sun gear 126, planet gears 128 and ring gear 134 comprise teeth about their periphery to intermesh with the other gears. However, for clarity only exemplary portions of the teeth are illustrated in FIG. 6. There are four planet gears 128 illustrated, although it will be apparent to the skilled reader that more or fewer planet gears 128 may be provided within the scope of the claimed invention. Practical applications of a planetary epicyclic gearbox 118 generally comprise at least three planet gears 128.

The epicyclic gearbox 118 illustrated by way of example in FIGS. 5 and 6 is of the planetary type, in that the planet carrier 130 is coupled to an output shaft via linkages 132, with the ring gear 134 fixed. However, any other suitable type of epicyclic gearbox 118 may be used. By way of further example, the epicyclic gearbox 118 may be a star arrangement, in which the planet carrier 130 is held fixed, with the ring (or annulus) gear 134 allowed to rotate. In such an arrangement, the fan 84 is driven by the ring gear 134. By way of further alternative example, the gearbox 118 may be a differential gearbox in which the ring gear 134 and the planet carrier 130 are both allowed to rotate.

It will be appreciated that the arrangement shown in FIGS. 5 and 6 is by way of example only, and various alternatives are within the scope of the present disclosure. Purely by way of example, any suitable arrangement may be used for locating the gearbox 118 in the gas turbine engine 80 and/or for connecting the gearbox 118 to the gas turbine engine 80. By way of further example, the connections (such as the linkages 132, 136 in the FIG. 5 example) between the gearbox 118 and other parts of the gas turbine engine 80 (such as the input shaft 116, the output shaft and the fixed structures) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 5. For example, where the gearbox 118 has a star arrangement (described above), the skilled person would readily understand that the arrangement of output and support linkages and bearing locations would typically be different to that shown by way of example in FIG. 5.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (for example, the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 4 has a split flow nozzle 98, 114 meaning that the flow through the bypass duct 112 has its own nozzle that is separate to and radially outside the core engine nozzle 98. However, this is not limiting, and any aspect of the present disclosure may also apply to engines in which the flow through the bypass duct 112 and the flow through the core 86 are mixed, or combined, before (or upstream of) a single nozzle, which may be referred to as a mixed flow nozzle. One or both nozzles (whether mixed or split flow) may have a fixed or variable area. In some arrangements, the gas turbine engine 80 may not comprise a gearbox 118.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. An apparatus for a gas turbine engine, the apparatus comprising:
    a core engine casing having a longitudinal axis and including: an inner wall defining at least part of a core airflow path through the gas turbine engine; an outer wall defining an external surface of the core engine casing, a first cavity being defined between the inner wall and the outer wall of the core engine casing;
    a plurality of guide vanes extending radially from the outer wall of the core engine casing;
    a torque box defined within the first cavity of the core engine casing and at least partially overlapping axially with the plurality of guide vanes, the torque box defining a second cavity; and
    an accessory gear box positioned within the second cavity of the torque box,
    wherein the inner wall of the core engine casing includes a bleed air valve and a conduit extending from the bleed air valve and through the second cavity of the torque box.

2. The apparatus as claimed in claim 1, wherein the torque box wholly overlaps axially with the plurality of guide vanes.

3. The apparatus as claimed in claim 1, wherein each of the plurality of guide vanes includes a root portion having a leading edge at a first axial position and a trailing edge at a second axial position, the torque box comprising a first wall located at the first axial position and a second wall located at the second axial position.

4. The apparatus as claimed in claim 1, further comprising a fuel pump coupled to the accessory gearbox and positioned within the second cavity of the torque box.

5. The apparatus as claimed in claim 1, further comprising an electrical machine coupled to the accessory gearbox and positioned within the second cavity of the torque box.

6. The apparatus as claimed in claim 1, further comprising an oil pump coupled to the accessory gearbox and positioned within the second cavity of the torque box.

7. The apparatus as claimed in claim 1, further comprising an oil tank positioned within the second cavity of the torque box.

8. A gas turbine engine for an aircraft comprising:
    the apparatus as claimed in claim 1;
    an engine core comprising a turbine, a compressor, and a core shaft connecting the turbine to the compressor;
    a fan located upstream of the engine core, the fan comprising a plurality of fan blades; and
    a gearbox that receives an input from the core shaft and outputs drive to the fan so as to drive the fan at a lower rotational speed than the core shaft.

9. The gas turbine engine as claimed in claim 8, wherein:
    the turbine is a first turbine, the compressor is a first compressor, and the core shaft is a first core shaft;
    the engine core further comprises a second turbine, a second compressor, and a second core shaft connecting the second turbine to the second compressor; and the second turbine, second compressor, and second core shaft are arranged to rotate at a higher rotational speed than the first core shaft.

* * * * *